(12) United States Patent
Carnell, Jr. et al.

(10) Patent No.: US 9,890,954 B2
(45) Date of Patent: Feb. 13, 2018

(54) COMBUSTOR CAP ASSEMBLY

(71) Applicant: General Electric Company, Schenectady, NY (US)

(72) Inventors: William Francis Carnell, Jr., Greer, SC (US); Carolyn Ashley Antoniono, Greenville, SC (US); Jonathan Hale Kegley, Greer, SC (US); Yon Han Chong, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 769 days.

(21) Appl. No.: 14/462,639

(22) Filed: Aug. 19, 2014

(65) Prior Publication Data

US 2016/0054003 A1 Feb. 25, 2016

(51) Int. Cl.
*F23R 3/28* (2006.01)
*F23R 3/60* (2006.01)
(Continued)

(52) U.S. Cl.
CPC .............. *F23R 3/283* (2013.01); *F02C 7/18* (2013.01); *F23R 3/002* (2013.01); *F23R 3/04* (2013.01); *F23R 3/045* (2013.01); *F23R 3/10* (2013.01); *F23R 3/54* (2013.01); *F23R 3/60* (2013.01); *F05B 2260/201* (2013.01);
(Continued)

(58) Field of Classification Search
CPC .. F23R 3/002; F23R 3/04; F23R 3/045; F23R 3/10; F23R 3/16; F23R 3/26; F23R 3/54; F23R 3/60; F23R 3/283; F23R 2900/03041; F23R 2900/03042; F23R 2900/03043; F23R 2900/03044; F02C 7/18; F05D 2240/126; F05D 2260/201;
(Continued)

(56) References Cited

U.S. PATENT DOCUMENTS 5,274,991 A 1/1994 Fitts
5,357,745 A 10/1994 Probert
(Continued)

OTHER PUBLICATIONS

Co pending U.S. Appl. No. 14/462,637, filed Aug. 19, 2014.
Co pending U.S. Appl. No. 14/462,646, filed Aug. 19, 2014.

*Primary Examiner* — Gerald L Sung
*Assistant Examiner* — Scott Walthour
(74) *Attorney, Agent, or Firm* — Dority & Manning, PA

(57) ABSTRACT

A combustor cap assembly includes an impingement plate coupled to an annular shroud and a cap plate which is coupled to the impingement plate and forms an impingement air plenum therebetween. The cap assembly further includes a flow conditioning plate which is coupled to a forward end portion of the shroud. The flow conditioning plate includes an inner band portion, an outer band portion and an annular portion which extends radially therebetween. The annular portion includes upstream side, a downstream side and a plurality of flow conditioning passages which provide for fluid communication through the upstream and downstream sides. The inner band portion of the flow conditioning plate at least partially defines an exhaust channel. The exhaust channel is in fluid communication with the impingement air plenum and an exhaust outlet. The exhaust outlet is positioned to route cooling air from the impingement air plenum into an annular flow passage defined within a combustor.

18 Claims, 6 Drawing Sheets

(51) Int. Cl.
*F23R 3/54* (2006.01)
*F23R 3/04* (2006.01)
*F23R 3/00* (2006.01)
*F02C 7/18* (2006.01)
*F23R 3/10* (2006.01)
*F23R 3/26* (2006.01)
*F23R 3/16* (2006.01)

(52) U.S. Cl.
CPC .. *F05B 2260/205* (2013.01); *F05D 2240/126* (2013.01); *F05D 2260/201* (2013.01); *F05D 2260/205* (2013.01); *F23R 3/16* (2013.01); *F23R 3/26* (2013.01); *F23R 3/286* (2013.01); *F23R 2900/03041* (2013.01); *F23R 2900/03042* (2013.01); *F23R 2900/03043* (2013.01); *F23R 2900/03044* (2013.01); *Y02T 50/675* (2013.01)

(58) Field of Classification Search
CPC .......... F05D 2260/205; F05B 2240/126; F05B 2260/201; F05B 2260/205
See application file for complete search history.

(56) References Cited

U.S. PATENT DOCUMENTS

| | | |
|---|---|---|
| 5,373,695 A | 12/1994 | Aigner |
| 6,484,505 B1 | 11/2002 | Brown |
| 6,923,002 B2 | 8/2005 | Crawley et al. |
| 8,387,396 B2 | 3/2013 | Chen |
| 2009/0188255 A1 | 7/2009 | Green |
| 2010/0300106 A1 | 12/2010 | Edwards et al. |
| 2010/0319349 A1* | 12/2010 | Rajaram ............... F02C 7/24 60/725 |
| 2011/0197586 A1 | 8/2011 | Berry |
| 2012/0055163 A1 | 3/2012 | Uhm |
| 2012/0060511 A1* | 3/2012 | Zuo .................. F01D 25/12 60/806 |
| 2012/0180490 A1 | 7/2012 | Takami |
| 2012/0279223 A1* | 11/2012 | Barker ............... F23R 3/283 60/740 |
| 2013/0019602 A1 | 1/2013 | Kim |
| 2013/0074503 A1* | 3/2013 | Rohrssen ............ F23R 3/10 60/740 |
| 2013/0074510 A1 | 3/2013 | Berry |
| 2013/0081400 A1* | 4/2013 | Rohrssen ........... F23R 3/286 60/772 |
| 2013/0086912 A1 | 4/2013 | Berry |
| 2014/0116060 A1* | 5/2014 | Melton ............... F23R 3/283 60/755 |
| 2014/0116066 A1* | 5/2014 | Melton ............... F23R 3/28 60/806 |

* cited by examiner

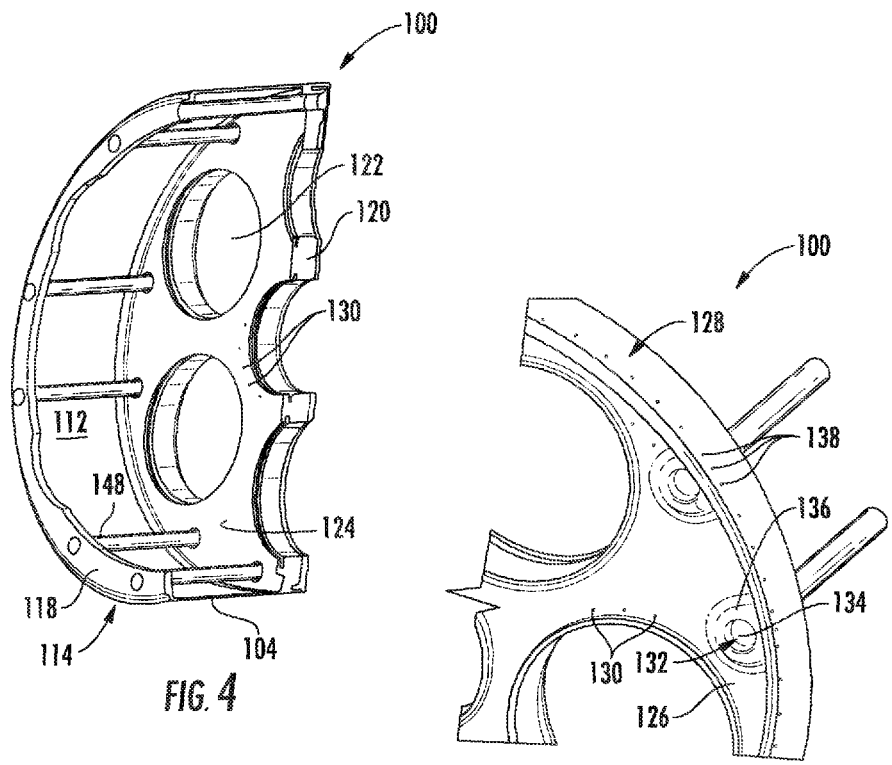
FIG. 4
FIG. 5
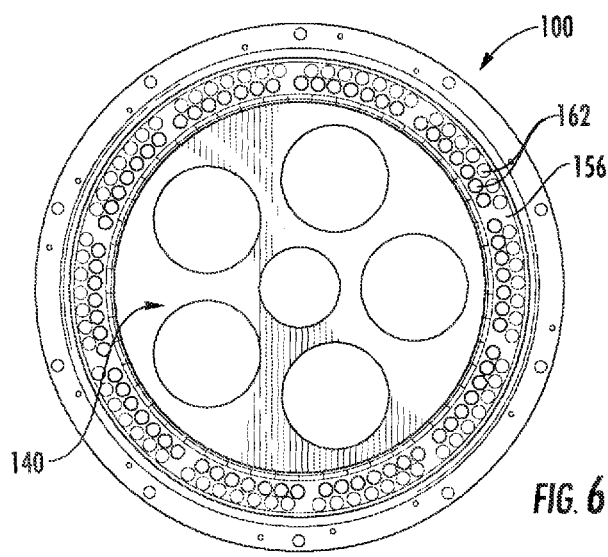
FIG. 6

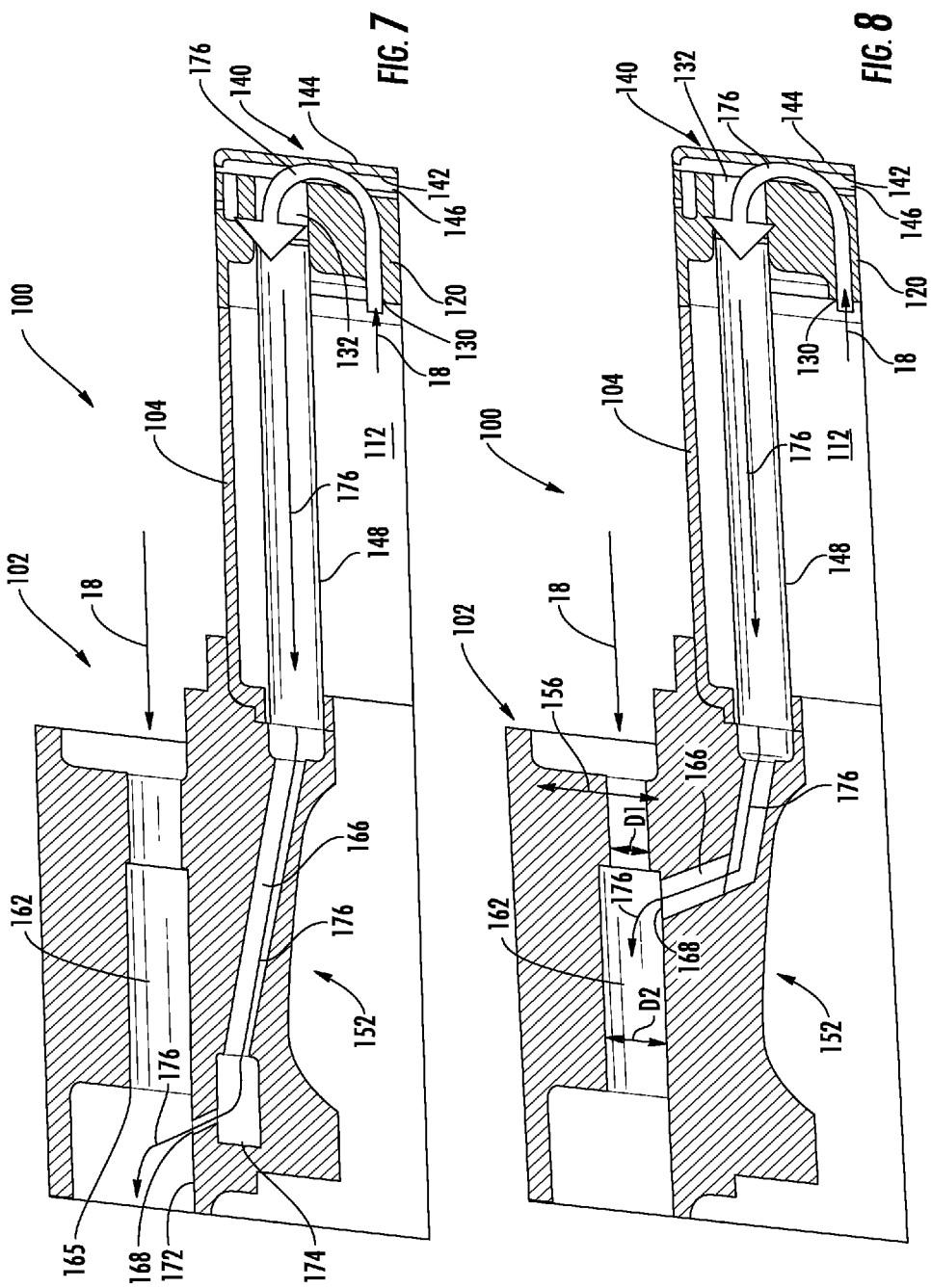

COMBUSTOR CAP ASSEMBLY

FIELD OF THE INVENTION

The present invention generally relates to a combustor cap assembly. More particularly, this invention involves a combustor configured to recirculate cooling air used to cool a cap plate of a cap assembly back into an annular flow passage defined within the combustor.

BACKGROUND OF THE INVENTION

In an air-ingesting turbomachine (e.g., a gas turbine), air enters a compressor and is progressively pressurized as it is routed towards a combustor. The compressed air is premixed with a fuel and ignited within a combustion chamber defined within the combustor, thus producing high temperature combustion gases. The combustion gases are then routed from the combustion chamber via a liner and/or a transition piece into a turbine section of the turbomachine where the combustion gases flow across alternating rows of stationary vanes and rotor blades which are secured to a rotor shaft. As the combustion gases flow across the rotor blades, kinetic and/or thermal energy are transferred to the rotor blades, thus causing the rotor shaft to rotate.

To increase turbine efficiency, modern combustors are operated at high temperatures which generate high thermal stresses on various mechanical components disposed within the combustor. As a result, at least a portion of the compressed air supplied to the combustor is used to cool these components. For example, particular combustors include a generally annular cap assembly that at least partially surrounds one or more fuel nozzles within the combustor. Certain cap assembly designs include a cap plate that is disposed at a downstream end of the cap assembly. The fuel nozzles extend at least partially through the cap plate which is typically disposed substantially adjacent to the combustion chamber. As a result, the cap plate is generally exposed to extremely high temperatures.

One way to cool the cap plate is to route a portion of the compressed air into the cap assembly and onto an upstream side of the cap plate. The compressed air is then routed through multiple cooling holes which extend through the cap plate. This method is known in the industry as effusion cooling. However, the compressed air flowing through the multiple cooling holes enters the combustion chamber generally unmixed with the fuel. As a result, emissions such as oxides of nitrogen (NOx) may be exacerbated and turbine efficiency may be decreased. Therefore, an improved system for cooling the cap plate which recirculates the compressed air used to cool the cap plate so that is may be premixed with fuel prior to combustion would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor cap assembly. The combustor cap assembly includes an impingement plate coupled to an aft end portion of an annular shroud. A cap plate is coupled to the impingement plate and an impingement air plenum is defined therebetween. A flow conditioning plate is coupled to a forward end portion of the shroud. The flow conditioning plate includes an inner band portion, an outer band portion and an annular portion which extends radially between the inner and outer band portions. The annular portion includes an upstream side and a downstream side and defines a plurality of flow conditioning passages which provide for fluid communication through the upstream and downstream sides. The inner band portion of the flow conditioning plate at least partially defines an exhaust channel which is in fluid communication with the impingement air plenum and with an exhaust outlet.

Another embodiment of the present invention is a combustor. The combustor includes at least one fuel nozzle that extends axially within an outer casing. The outer casing at least partially defines a high pressure plenum within the combustor. The combustor further includes a combustor cap assembly which surrounds at least a portion of the fuel nozzle within the outer casing. The combustor cap assembly comprises an impingement plate that is coupled to an aft end portion of an annular shroud and a cap plate which is coupled to an opposite end of the impingement plate. The impingement plate and the shroud at least partially define a cooling air plenum therebetween. The cap plate and the impingement plate define an impingement air plenum which is in fluid communication with the cooling air plenum. The combustor further includes a flow conditioning plate which is coupled to a forward end portion of the shroud. The flow conditioning plate includes an inner band portion, an outer band portion and an annular portion which extends radially therebetween. The annular portion is disposed within an annular flow passage defined within the outer casing. The annular flow passage provides for fluid communication between the high pressure plenum and a head end portion of the combustor. The annular portion includes an upstream side, a downstream side and a plurality of flow conditioning passages which provide for fluid communication from the high pressure plenum through the annular portion and into the head end portion. The inner band portion at least partially defines an exhaust channel which is in fluid communication with the impingement air plenum. The exhaust channel is in fluid communication with an exhaust outlet where the exhaust outlet is in fluid communication with the annular flow passage.

Another embodiment of the present invention is a gas turbine. The gas turbine includes a compressor section, a combustion section downstream from the compressor section and a turbine section disposed downstream from the combustion section. The combustion section includes at least one combustor that is at least partially surrounded by an outer casing. The outer casing at least partially defines a high pressure plenum which is in fluid communication with the compressor section. The combustor includes at least one fuel nozzle which extends axially within the outer casing and a combustor cap assembly which circumferentially surrounds at least a portion of the fuel nozzle. The combustor cap assembly comprises an impingement plate that is coupled to an aft end portion of an annularly shaped shroud and a cap plate which is coupled to an opposite end of the impingement plate. The impingement plate and the shroud at least partially define a cooling air plenum. The cap plate and the impingement plate at least partially define an impingement air plenum which is in fluid communication with the cooling air plenum. A flow conditioning plate is coupled to a forward end portion of the shroud. The flow conditioning plate includes an inner band portion, an outer band portion and an annular portion which extends radially therebetween. The annular portion is disposed within an annular flow passage which provides for fluid communication between the high pressure plenum and a head end portion of the combustor. The annular portion includes an upstream side, a downstream side and a plurality of flow conditioning passages which provide for fluid communication from the high pressure plenum through the annular portion and into the head end portion. The inner band portion at least partially defines an exhaust channel which is in fluid communication with the impingement air plenum. The exhaust channel is in fluid communication with an exhaust outlet where the exhaust outlet is in fluid communication with the annular flow passage.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 4 is a perspective aft or back view of a portion of the combustor cap assembly as shown in FIG. 3, according to one or more embodiments of the present invention;

FIG. 5 is a front view of a portion of the combustor cap assembly as shown in FIG. 3, according to one or more embodiments of the present invention;

FIG. 6 is a front view of the combustor cap assembly, according to one or more embodiments;

FIG. 7 is a cross sectional side view of a portion of an exemplary combustor cap assembly according to at least one embodiment of the present invention;

FIG. 8 is a cross sectional side view of a portion of an exemplary combustor cap assembly according to at least one embodiment of the present invention.

DETAILED DESCRIPTION OF THE INVENTION

Figure 1:
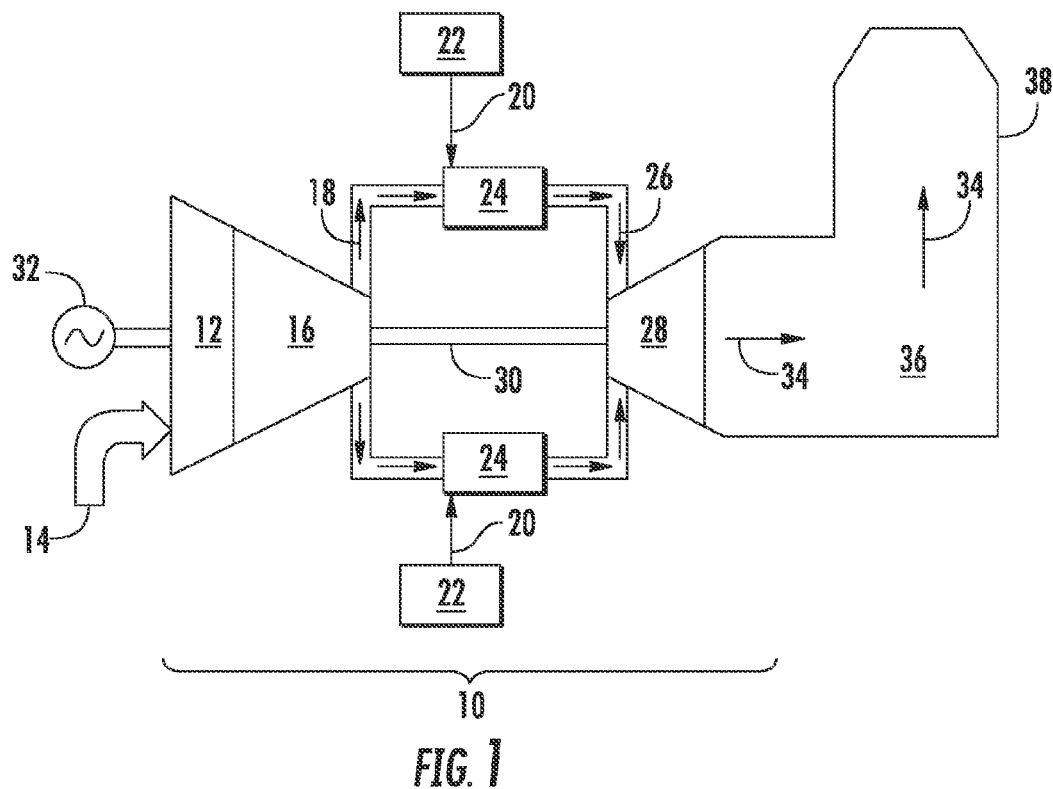
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in an aircraft gas turbine or marine gas turbine.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid such as air 14 entering the gas turbine 10. The air 14 flows to a compressor section where a compressor 16 progressively imparts kinetic energy to the air 14 to produce a compressed or pressurized air 18.

The compressed air 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
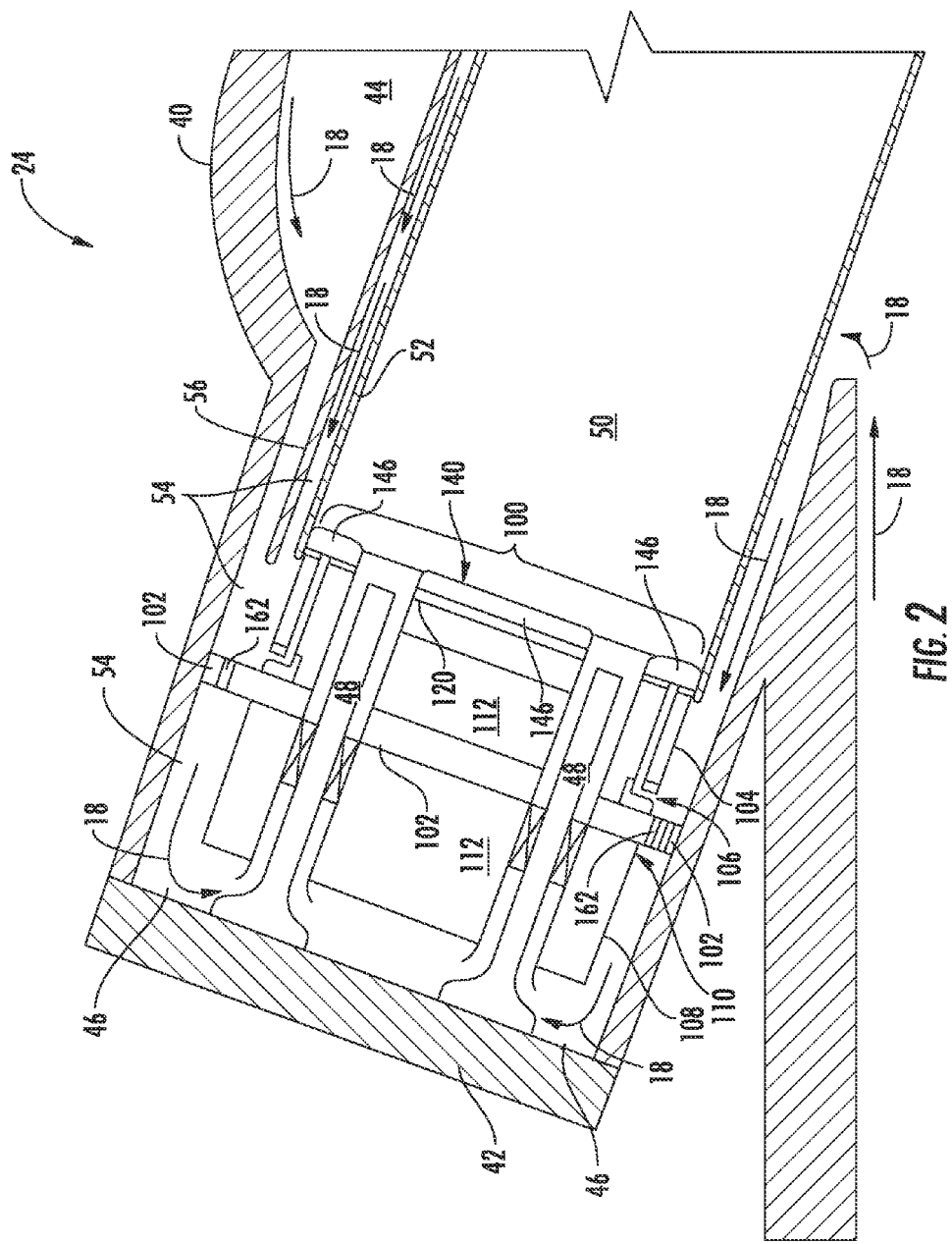
FIG. 2 is a cross sectional side view of a portion of an exemplary combustion section including an exemplary combustor as may incorporate various embodiments of the present invention.

FIG. 2 is a cross sectional side view of a portion of an exemplary combustion section 16 including an exemplary combustor 24 according to one or more embodiments of the present invention. As shown in FIG. 2, the combustor 24 is at least partially surrounded by at least one outer casing 40 such as a compressor discharge casing. The outer casing 40 is in fluid communication with the compressor 16 (FIG. 1) so as to receive at least a portion of the compressed air 18 therefrom.

In one configuration, as shown in FIG. 2, an end cover 42 is coupled to the outer casing 40 to provide a seal around an opening defined within the outer casing 40. The opening is generally sized for receiving the combustor 24. The outer casing 40 and/or the end cover 42 at least partially define a high pressure plenum 44 which at least partially surrounds the combustor 24. A head end portion 46 of the combustor 24 is at least partially defined by the end cover 42 within the outer casing 40. The head end portion 46 defines an area within the combustor 24 where a portion of the compressed air 18 from the high pressure plenum 44 reverses flow direction.

At least one fuel nozzle 48 extends substantially axially within the outer casing 40 with respect to an axial centerline of the combustor 24 and/or an axial centerline of the end cover 42. As shown in FIG. 2, the combustor 24 may include a plurality of fuel nozzles 48 extending axially within the outer casing 40. The fuel nozzle 48 may be coupled at a first end to the end cover 42. A second or downstream end of the fuel nozzle 48 terminates proximate to a combustion chamber or zone 50 defined within a combustion liner 52 which extends downstream from the fuel nozzle 48.

In particular embodiments, the combustion liner 52 may at least partially define an annular flow passage 54 within the outer casing 40. In particular embodiments, the annular flow passage 54 may be defined or further defined by one or more of an impingement sleeve or liner 56 which surrounds the combustion liner 52. In particular embodiments, the annular flow passage 54 may be defined or further defined by any one or more of the outer casing 40, the end cover 42 and/or other liners or features such as an inner wall provided within the outer casing 40. The annular passage 54 provides for fluid communication between the high pressure plenum 44 and the head end portion 46 of the combustor 24.

In various embodiments, at least a portion of the fuel nozzle 48 or nozzles extends axially within a combustor cap assembly 100. The combustor cap assembly 100 extends radially, circumferentially and axially within the outer casing 40. In one embodiment, the combustor cap assembly 100 includes an annularly shaped flow conditioning plate 102 and an annularly shaped shroud 104.

The shroud 104 extends axially away from an aft end portion 106 of the flow conditioning plate 102. In particular embodiments, the combustor cap assembly 100 may include an annularly shaped secondary shroud 108 which extends axially from a forward end portion 110 of the flow conditioning plate 102 towards the end cover 42. The shroud 104 and/or the secondary shroud 108 may be coaxially aligned with the flow conditioning plate 102. The flow conditioning plate 102, the shroud 104 and/or the secondary shroud 108 circumferentially surround at least a portion of the fuel nozzle 48 or nozzles. In one embodiment, the flow conditioning plate 102 and the shroud 104 at least partially define a cooling air plenum 112 around the fuel nozzle 48 within the combustor cap assembly 100. In other embodiments, the cooling air plenum 112 may be further defined by the secondary shroud 108. The cooling air plenum 112 is in fluid communication with the head end portion 46 of the combustor 24.

Figure 3:
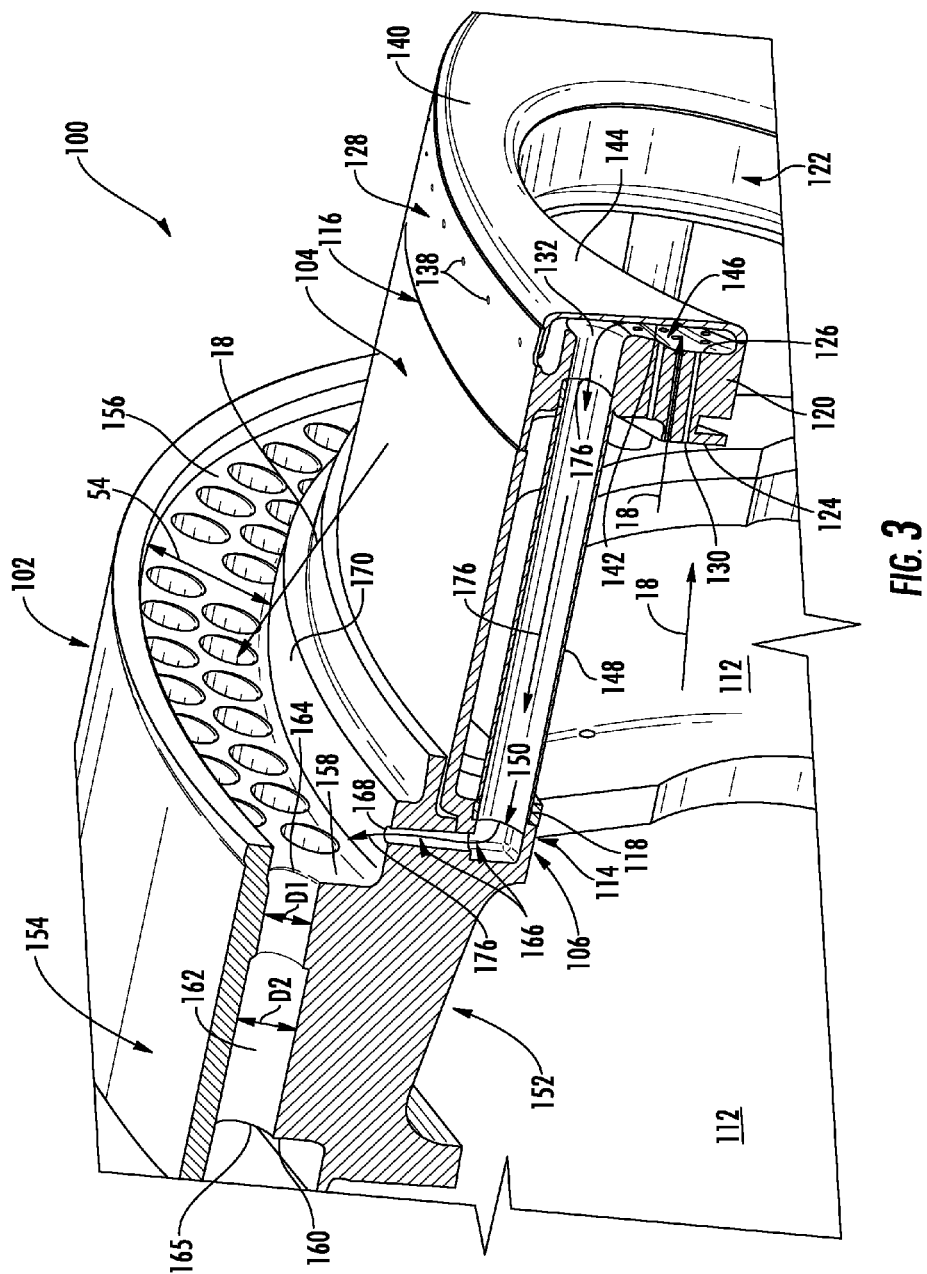
FIG. 3 is a cross sectional perspective view of a portion of an exemplary combustor cap assembly, according to one or more embodiments of the present invention.

FIG. 3 provides a cross sectional perspective view of a portion of the combustor cap assembly 100 as shown in FIG. 2, according to one or more embodiments of the present invention. FIG. 4 is a perspective aft or back view of a portion of the combustor cap assembly 100 according to one or more embodiments. FIG. 5 provides a forward or front perspective view of a portion of the combustor cap assembly 100 according to one or more embodiments. FIG. 6 provides a front view of the combustor cap assembly 100, according to one or more embodiments.

As shown in FIG. 3, the shroud 104 includes a first or forward end portion 114 which is axially separated from a second or aft end portion 116. In one embodiment, as shown in FIGS. 3 and 4, a flange 118 extends radially inwardly from the shroud 104 towards an axial centerline of the shroud 104. The flange 118 may be disposed proximate to the first end portion 114. The flange 118 may be used to couple or connect the shroud 104 to a mounting feature (not shown) of the flow conditioning plate 102. For example, one or more bolts or other suitable fasteners (not shown) may extend through the flange 118 so as to secure or couple the two components together.

As shown in FIGS. 2 and 3, the combustor cap assembly 100 further includes an impingement plate 120. In one embodiment, as shown in FIG. 3, the impingement plate 120 is coupled to the shroud 104 proximate to the second end portion 116. The impingement plate 120 extends radially and circumferentially at least partially across the second end portion 116 of the shroud 104. The impingement plate 120 may at least partially define at least one fuel nozzle passage 122 which extends generally axially therethrough for receiving the fuel nozzle 46 (FIG. 2).

As shown in FIGS. 3 and 4, the impingement plate 120 includes a first or upstream side portion 124. As shown in FIGS. 3 and 5, the impingement plate 120 also includes a second or downstream side portion 126. As shown in FIG. 3 the impingement plate 120 further includes an outer band portion 128. The outer band portion 128 at least partially defines a radially outer perimeter of the impingement plate 120. In various embodiments, as shown in FIGS. 3 and 4, the impingement plate 120 at least partially defines a plurality of impingement cooling holes 130. The impingement cooling holes 130 extend through the first side portion 124 and the second side portion 126 so as to provide for fluid communication from the cooling air plenum 112 through the impingement plate 120.

In one embodiment, as shown in FIG. 3, the impingement plate 120 further defines at least one cooling flow return passage 132. As illustrated, the cooling flow return passage 132 extends through the first side portion 124 and the second side portion 126 so as to provide for fluid communication through the impingement plate 120. In one embodiment, the cooling flow return passage 132 extends substantially axially through the impingement plate 120. As shown in FIG. 5, an inlet 134 to the cooling flow return passage 132 is defined along the second side portion 126 of the impingement plate 120. In one embodiment, a raised portion 136 of the second side portion 126 surrounds the inlet 134. The raised portion 136 is raised axially outwardly with respect to the surrounding second side portion 126.

In particular embodiments, as shown in FIGS. 3 and 5, the outer band portion 128 at least partially defines a plurality of cooling passages 138 which extend substantially radially through the outer band portion 128 of the impingement plate 120. In one embodiment, as shown in FIG. 5, a greater number of the cooling passages 138 may be formed or concentrated proximate to the inlet 134 of the cooling flow return passage 132 than along areas of the outer band portion 128 which are not close to the cooling flow return passage 132.

As shown in FIGS. 2, 3 and 6, the combustor cap assembly 100 further includes a cap plate 140 which is coupled to the impingement plate 120. In one embodiment, as shown in FIG. 3, the cap plate 140 is coupled to the outer band portion 128 of the impingement plate 120. As shown in FIG. 6, the cap plate 140 extends circumferentially and radially around the impingement plate 120. As shown in FIG. 3, the cap plate 140 includes an impingement side 142 which faces the second side portion 126 of the impingement plate 120. An opposite or hot side 144 of the cap plate 140 faces towards the combustion zone or chamber 50 (FIG. 1) when installed into the combustor 24.

The impingement side 140 is axially spaced from the second side portion 126 to define an impingement air plenum 146 therebetween. The impingement cooling holes 130 provide for fluid communication from the cooling air plenum 112 (FIGS. 2 and 3) into the impingement air plenum 146. The impingement cooling holes 130 may be generally aligned to focus a jet of the compressed air 18 directly onto the impingement side 142 of the cap plate 140 during operation of the combustor 24, thus providing for jet or impingement cooling thereof. The cooling flow return passage 132 provides for fluid communication out of the impingement air plenum 146. In one embodiment, the cooling passages 138 also provide for fluid communication out of the impingement air plenum 146. In one embodiment, as shown in FIG. 3, the cap plate 140 further defines the fuel nozzle passage 122.

In various embodiments, as shown in FIG. 3, the combustor cap assembly 100 further includes at least one fluid conduit 148 which is in fluid communication with the impingement air plenum 146 via the cooling flow return passage 132. In one embodiment, the fluid conduit 148 is coaxially aligned with the cooling flow return passage 132. The fluid conduit 148 extends substantially axially from the first side portion 124 of the impingement plate 120 towards the first end portion 114 of the shroud 104. Although shown as a generally circular tube, the fluid conduit 148 may have any cross sectional shape. In one embodiment, as shown in FIG. 3, an outlet end 150 of the fluid conduit 148 extends at least partially through the flange 118. The fluid conduit 148 defines an exhaust passage which extends from the impingement plenum 146 and/or the cooling flow return passage 132, through the cooling air plenum 112 and which is fluidly isolated from the cooling air plenum 112.

In various embodiments, as shown in FIG. 3, the flow conditioning plate 102 is coupled to the forward end portion 114 of the shroud 104. For example, in one embodiment, the aft end portion 106 of the flow conditioning plate 102 is coupled to the forward end portion 114 and/or the flange 118 of the shroud 104. The flow conditioning plate 102 may be coupled to the forward end portion 114 and/or the flange 118 of the shroud 104 via mechanical fasteners (not shown) such as bolts or the like and/or by welding or other suitable connection means.

In particular embodiments, as shown in FIG. 3, the flow conditioning plate 102 includes an inner band portion 152, an outer band portion 154 and an annular portion 156. The annular portion 156 extends axially and radially between the inner and outer band portions 152, 154. When installed into the combustor 24, as shown in FIG. 2, the annular portion 156 extends radially and axially within the annular flow passage 54. In particular embodiments, the annular portion 156 fluidly separates the high pressure plenum 44 from the head end portion 46. As shown in FIG. 3, the annular portion 156 includes an upstream side 158 and a downstream side 160. A plurality of flow conditioning passages 162 provide for fluid communication through the annular portion 156, particularly through the upstream and downstream sides 158, 160.

As shown in FIG. 3, the annular portion 156 has a relatively wide axial thickness so that the flow conditioning passages 162 become elongated tubes that stretch between inlets 164 formed on the upstream side 158 of the annular portion 156 and outlets 165 formed on the downstream side 160. Though other shapes are also possible, the flow conditioning passages 162 may have a cylindrical shape. The flow conditioning passages 162 may be parallel to each other, as well as being parallel to a center axis of the combustor 24. As illustrated, the upstream side 158 of the annular portion 156 may include a planar surface that is arranged approximately perpendicular to the flow direction through the annular passage 54. The inlets 164 of the flow conditioning passages 162 may be formed through the upstream side 158.

The downstream end 160 of the annular portion 156 also may include a planar surface approximately perpendicular to the flow direction through annular passage 54. The outlets 165 of the flow conditioning passages 162 may be formed through this downstream side 160. The number of flow conditioning passages 162 included within the annular portion 156 of the flow conditioning plate 102 may vary depending on application. In an exemplary embodiment, the number of flow conditioning passages 162 may be between 100 and 200.

As illustrated in FIG. 6, the flow conditioning passages 162 may be configured within the annular portion 156 so that circumferentially arranged rows of the flow conditioning passages 162 are formed. As illustrated, the rows may include an inner radial row and an outer radial row, with the inner radial row residing closer to the inner band portion 152. As also illustrated, the flow conditioning passages 162 of the inner radial row and the outer radial row may be clocked or configured so to include an angular offset. In the case where the flow conditioning passages 162 are positioned so to form an inner radial row and an outer radial row in radial row, each row may include between 50 and 100 flow conditioning passages 162, though other configurations are also possible.

In particular embodiments, as shown in FIG. 3, at least some of the flow conditioning passages 162 may have a cross sectional diameter D which varies between the upstream side 158 and the downstream side 160. For example, in one embodiment a flow conditioning passage 162 may have a first cross sectional diameter $D_1$ proximate to the inlet 164 of the flow conditioning passage 162 and a second cross sectional diameter $D_2$ downstream from the first cross sectional diameter $D_1$. In one embodiment, first cross sectional diameter $D_1$ is less than second cross sectional diameter $D_2$. The variable cross sectional diameter generally allows for conditioning of the flow of the compressed air 18 as it flows from the high pressure plenum 44 through the flow conditioning plate 102 and towards to the head end 46. For example, the flow conditioning passages 162 may reduce flow turbulence and/or reduce flow pressure between the high pressure plenum 44 and the head end 46, thus enhancing mixing with the fuel prior to combustion.

In various embodiments, as illustrated in FIGS. 3, 7, 8 and 9, the inner band portion 152 of the flow conditioning plate 102 at least partially defines an exhaust channel 166. The exhaust channel 166 is in fluid communication with the impingement air plenum 146 and an exhaust outlet 168. In various embodiments, the fluid conduit 148 extends within the shroud 104 and/or the cooling air plenum 112 between the impingement plate 120 and the inner band portion 152 of the flow conditioning plate 102. In this manner, the fluid conduit 148 provides for fluid communication between the impingement air plenum 146 and the exhaust channel 166.

In one embodiment, as shown in FIG. 3, the exhaust outlet 168 is disposed along and/or extends through a radially outer surface 170 of the inner band portion 152 upstream from the inlets 164 of the flow conditioning passages 162. In one embodiment, as shown in FIG. 7, the exhaust outlet 168 is disposed along a radially outer surface 172 of the inner band portion 152 downstream from the outlets 165 of the flow conditioning passages 162 and/or the downstream side 160 of the annular portion 156. In one embodiment, as illustrated in FIG. 7, the inner band portion 152 at least partially defines a cooling air exhaust plenum 174 which extends generally circumferentially within the inner band portion 152. The cooling air exhaust plenum 174 is in fluid communication with the exhaust channel 166 and the exhaust outlet 168. The cooling air exhaust plenum 174 may be in fluid communication with a plurality of exhaust channels 166 and/or a plurality of exhaust outlets 168.

In particular embodiments, as shown in FIG. 8, the exhaust channel 166 is at least partially defined within the annular portion 156 of the flow conditioning plate 102. In one embodiment, as shown in FIG. 8, the exhaust outlet 168 is disposed within a flow conditioning passages 162 of the plurality of flow conditioning passages 162. In one embodiment, the exhaust outlet 168 is disposed within a flow conditioning passage 162 having a variable cross sectional diameter. For example, first cross sectional diameter $D_1$ is less than or smaller than second cross sectional diameter $D_2$.

Figure 9:
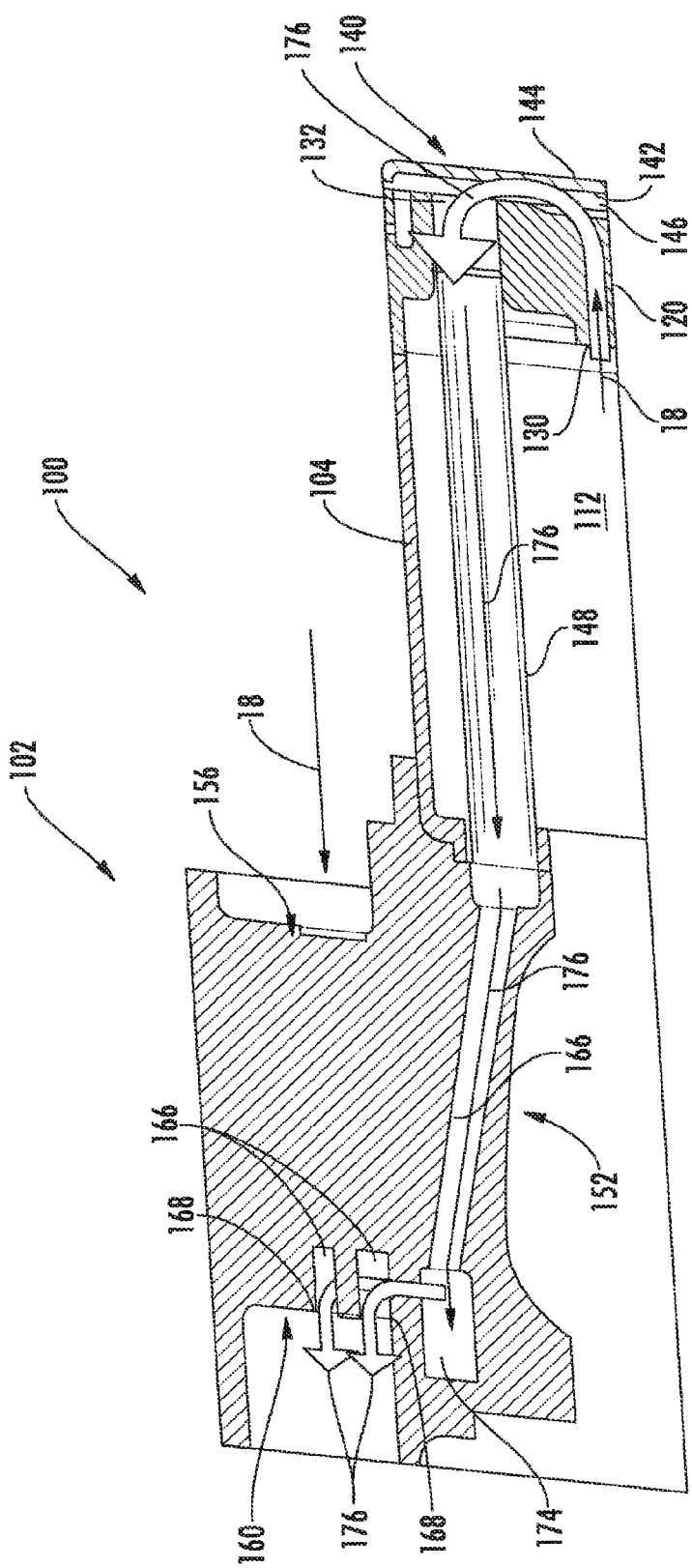
FIG. 9 is a cross sectional side view of a portion of an exemplary combustor cap assembly according to at least one embodiment of the present invention.

In particular embodiments, as shown in FIG. 9, the exhaust channel 166 is at least partially defined within the annular portion 156 of the flow conditioning plate 102 and the exhaust outlet 168 is disposed along the downstream side 160 of the annular portion 156. In this manner, the exhaust channel 166 extends through a portion of the annular portion 156 and is fluidly isolated from the flow conditioning passages 162 (not shown). In one embodiment, as shown in FIG. 9, the exhaust channel 166 and/or the air exhaust plenum 174 may be in fluid communication with a plurality of exhaust outlets 168 disposed along the downstream side 160 of the annular portion 156.

In operation, as shown in FIG. 2, the compressed air 18 flows from the high pressure plenum 44 along the annular flow passage 54, through the flow conditioning passages 162 of the flow conditioning plate 102 and into the head end portion 46 of the combustor 24. The flow conditioning passages 162 may condition uneven flow characteristics or distributions upstream of the head end portion 46 and thereby make the flow of the compressed air more uniform before entering the combustor cap assembly 100 and/or the fuel nozzle 48. A first portion of the compressed air 18 flows through the fuel nozzle 48 or nozzles where it is premixed with fuel upstream from the combustion chamber 50 prior to ignition. A second portion of the compressed air 18 is routed into the cooling air plenum 112.

As shown collectively in FIGS. 3, 7, 8 and 9, according to the various embodiments, the second portion of the compressed air 18 flows from the cooling air plenum 112 into the impingement air plenum 146 via the impingement cooling holes 130. The impingement cooling holes 130 direct jets of the compressed air 18 onto the impingement side 142 of the cap plate 140. As a result, thermal energy from the cap plate 140 is transferred to the compressed air 18, thus providing impingement or convective cooling to the cap plate 104 and producing cooling exhaust air 176 within the impingement air plenum 146. The cooling exhaust air 176 then flows out of the impingement air plenum 146 via the cooling flow return passage 132 and flows through the cooling air plenum 112 via the fluid conduit 148. The fluid conduit 148 fluidly isolates the cooling exhaust air 176 from the compressed air 18 flowing within the cooling air plenum 112. The cooling exhaust air 176 then exits the fluid conduit 148 and enters the exhaust channel 166.

In various embodiments, the cooling exhaust air 176 flows from the exhaust channel 166 through the exhaust outlet 168 and into the annular flow passage 54 where it is mixed with compressed air 18 from the high pressure plenum 44 for premixing with the fuel. In one embodiment, as shown in FIG. 3, the cooling exhaust air 176 is routed through the exhaust outlet 168 upstream of the inlets 164 to the flow conditioning passages 162 of the annular portion 156. In one embodiment as illustrated in FIG. 7, the cooling exhaust air 176 is routed through the exhaust outlet 168 downstream of the flow conditioning passages 162 of the annular portion 156. In another embodiment, as shown in FIG. 8, the cooling exhaust air 176 is routed through an exhaust outlet 168 disposed within at least one of the flow conditioning passages 162. In another embodiment, as shown in FIG. 9, the cooling exhaust air 176 is routed through an exhaust outlet 168 disposed along the downstream side 160 of the annular portion 156.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A combustor cap assembly, comprising:
    an impingement plate coupled to an aft end portion of an annular shroud;
    a cap plate coupled to the impingement plate, the cap plate and the impingement plate defining an impingement air plenum therebetween; and
    a flow conditioning plate coupled to a forward end portion of the annular shroud, the flow conditioning plate having an inner band portion, an outer band portion and an annular portion which extends radially between the inner and outer band portions, with respect to a longitudinal axis of the combustor cap assembly, the annular portion having an upstream side and a downstream side, with respect to a flow through the flow conditioning plate, the annular portion defining a plurality of flow conditioning passages which provide for fluid communication through the upstream and downstream sides;
    wherein the inner band portion of the flow conditioning plate at least partially defines an exhaust channel, the exhaust channel having an exhaust outlet and being connected to, and in fluid communication with, the impingement air plenum by a tube disposed radially inward of the annular shroud and configured such that air flows through the exhaust channel from the impingement air plenum to the exhaust outlet.

2. The combustor cap assembly as in claim 1, wherein the exhaust outlet extends through a radially outer surface of the inner band portion upstream from the plurality of flow conditioning passages.

3. The combustor cap assembly as in claim 1, wherein the exhaust outlet extends through a radially outer surface of the inner band portion downstream from the plurality of flow conditioning passages.

4. The combustor cap assembly as in claim 1, wherein the inner band portion at least partially defines a cooling air exhaust plenum within the inner band portion, the cooling air exhaust plenum being in fluid communication with the exhaust channel and the exhaust outlet.

5. The combustor cap assembly as in claim 1, wherein the exhaust channel is further defined within the annular portion of the flow conditioning plate.

6. The combustor cap assembly as in claim 5, wherein the exhaust outlet is disposed within one or more flow conditioning passages of the plurality of flow conditioning passages.

7. The combustor cap as in claim 5, wherein the exhaust outlet is disposed along the downstream side of the annular portion of the flow conditioning plate.

8. A combustor, comprising:
a fuel nozzle extending axially within an outer casing, wherein the outer casing defines a high pressure plenum within the combustor; and
a combustor cap assembly surrounding at least a portion of the fuel nozzle within the outer casing, the combustor cap assembly comprising:
an impingement plate coupled to an aft end portion of an annular shroud and a cap plate coupled to the impingement plate, the impingement plate and the annular shroud at least partially defining a cooling air plenum, the cap plate and the impingement plate defining an impingement air plenum in fluid communication with the cooling air plenum; and
a flow conditioning plate coupled to a forward end portion of the annular shroud, the flow conditioning plate having an inner band portion, an outer band portion and an annular portion which extends radially between the inner band portion and the outer band portion, with respect to a longitudinal axis of the combustor, the annular portion being disposed within an annular flow passage, the annular flow passage providing for fluid communication between the high pressure plenum and a head end portion of the combustor;
wherein the annular portion includes an upstream side, with respect to a flow through the flow conditioning plate, a downstream side and a plurality of flow conditioning passages which provide for fluid communication from the high pressure plenum through the annular portion and into the head end portion;
wherein the inner band portion at least partially defines an exhaust channel having an exhaust outlet, the exhaust channel being connected to, and in fluid communication with, the impingement air plenum by a tube disposed radially inward of the annular shroud and configured such that air flows through the exhaust channel from the impingement air plenum to the exhaust outlet;
wherein the exhaust outlet is in fluid communication with the annular flow passage.

9. The combustor as in claim 8, wherein the exhaust outlet extends through a radially outer surface of the inner band portion upstream from the plurality of flow conditioning passages.

10. The combustor as in claim 8, wherein the exhaust outlet extends through a radially outer surface of the inner hand portion downstream from the plurality of flow conditioning passages.

11. The combustor as in claim 8, wherein the inner band portion at least partially defines a cooling air exhaust plenum within the inner band portion, the cooling air exhaust plenum being in fluid communication with the exhaust channel and the exhaust outlet.

12. The combustor as in claim 8, wherein the exhaust channel is further defined within the annular portion of the flow conditioning plate.

13. The combustor as in claim 12, wherein the exhaust outlet is disposed within one flow conditioning passage of the plurality of flow conditioning passages.

14. The combustor as in claim 12, wherein the exhaust outlet is disposed along the downstream side of the annular portion of the flow conditioning plate.

15. A gas turbine, comprising:
a compressor section, a combustion section downstream from the compressor section and a turbine section disposed downstream from the combustion section, the combustion section including a combustor at least partially surrounded by an outer casing which defines a high pressure plenum in fluid communication with the compressor section, the combustor including a fuel nozzle extending axially within the outer casing and a combustor cap assembly which circumferentially surrounds at least a portion of the fuel nozzle, the combustor cap assembly comprising:
an impingement plate coupled to an aft end portion of an annular shroud and a cap plate coupled to the impingement plate, the impingement plate and the annular shroud at least partially defining a cooling air plenum, the cap plate and the impingement plate defining an impingement air plenum in fluid communication with the cooling air plenum; and
a flow conditioning plate coupled to a forward end portion of the annular shroud, the flow conditioning plate having an inner band portion, an outer band portion and an annular portion which extends radially between the inner band portion and the outer band portion, with respect to a longitudinal axis of the combustor, the annular portion being disposed within an annular flow passage, the annular flow passage providing for fluid communication between the high pressure plenum and a head end portion of the combustor;
wherein the annular portion includes an upstream side, with respect to a flow through the flow conditioning plate, a downstream side and a plurality of flow conditioning passages which provide for fluid communication from the high pressure plenum through the annular portion and into the head end portion;
wherein the inner band portion at least partially defines an exhaust channel, the exhaust channel being in fluid communication with the impingement air plenum;
wherein the exhaust channel is in fluid communication with an exhaust outlet, the exhaust outlet being in fluid communication with the annular flow passage such that air flows through the exhaust channel from the impingement air plenum to the exhaust outlet during operation of the gas turbine.

16. The gas turbine as in claim 15, wherein the exhaust outlet is disposed along a radially outer surface of the inner band portion upstream from the plurality of flow conditioning passages.

17. The gas turbine as in claim 15, wherein the exhaust outlet is disposed along a radially outer surface of the inner band portion downstream from the plurality of flow conditioning passages.

18. The gas turbine as in claim 15, wherein the exhaust channel is further defined within the annular portion of the flow conditioning plate, wherein the exhaust outlet is disposed along the downstream side of the annular portion of the flow conditioning plate or within at least one flow conditioning passage of the plurality of flow conditioning passages.

* * * * *

UNITED STATES PATENT AND TRADEMARK OFFICE
CERTIFICATE OF CORRECTION

PATENT NO. : 9,890,954 B2  
APPLICATION NO. : 14/462639  
DATED : February 13, 2018  
INVENTOR(S) : William Francis Carnell, Jr. et al.

Page 1 of 1

It is certified that error appears in the above-identified patent and that said Letters Patent is hereby corrected as shown below:

In the Claims

Claim 10, Column 11, Line 55, reads "hand portion downstream from the plurality of flow" should read --band portion downstream from the plurality of flow--

Signed and Sealed this  
Tenth Day of April, 2018

Andrei Iancu  
*Director of the United States Patent and Trademark Office*